US010918019B2

(12) United States Patent
Coppinger et al.

(10) Patent No.: US 10,918,019 B2
(45) Date of Patent: Feb. 16, 2021

(54) SYSTEM FOR ADJUSTING THE CONVEYOR BELT TENSION FORCE WITHIN AN AGRICULTURAL HARVESTER

(71) Applicant: CNH Industrial America LLC, New Holland, PA (US)

(72) Inventors: Jason R. Coppinger, Davenport, IA (US); Bryan Benjamin Finley, Bettendorf, IA (US); Kevin Hammer, Eldridge, IA (US); William Lee Cooksey, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 229 days.

(21) Appl. No.: 16/025,290

(22) Filed: Jul. 2, 2018

(65) Prior Publication Data

US 2020/0000038 A1    Jan. 2, 2020

(51) Int. Cl.
*A01D 61/02*    (2006.01)
*A01D 61/00*    (2006.01)
*A01F 12/10*    (2006.01)
*F16H 31/00*    (2006.01)

(52) U.S. Cl.
CPC .......... *A01D 61/02* (2013.01); *A01D 61/008* (2013.01); *A01F 12/10* (2013.01); *F16H 31/001* (2013.01)

(58) Field of Classification Search
CPC ...... A01D 61/02; A01D 61/008; A01D 57/20; F16H 31/001; F16H 2007/0891; F16H 2007/0806; F16H 2007/088; F16H 7/1263; A01F 12/10; B65G 23/44; B65G 39/16; B65G 23/00
See application file for complete search history.

(56) References Cited

U.S. PATENT DOCUMENTS

| 293,383 | A | * | 2/1884 | Wagner | B65G 23/44 198/813 |
| 380,400 | A | * | 4/1888 | Menke | B65G 23/44 198/813 |
| 808,122 | A | * | 12/1905 | Tanck | B65G 23/44 198/816 |
| 1,000,974 | A | * | 8/1911 | Anderson | B65G 23/44 198/813 |

(Continued)

FOREIGN PATENT DOCUMENTS

| DE | 2318923 A1 | * 10/1974 | ............ B65G 23/44 |
| EP | 1849352 A1 | 10/2007 | |
| GB | 2042453 A | 9/1980 | |

OTHER PUBLICATIONS

Extended European Search Report for EP Application No. 19183206.2 dated Dec. 3, 2019 (five pages).

*Primary Examiner* — Arpad Fabian-Kovacs
(74) *Attorney, Agent, or Firm* — Peter Zacharias; Patrick Sheldrake (57) ABSTRACT

In one aspect, a system for adjusting the conveyor belt tension force within an agricultural harvester may include a conveyor having a first roller, a second roller spaced apart from the first roller, and a conveyor belt configured to engage the first and second rollers. The system may also include a tensioner assembly having a ratcheting mechanism configured to selectively adjust a position of the first roller relative to the second roller to adjust a tension force exerted on the conveyor belt.

17 Claims, 9 Drawing Sheets

(56) References Cited

U.S. PATENT DOCUMENTS

| | | | | |
|---|---|---|---|---|
| 1,347,121 | A * | 7/1920 | Rice | B65G 23/44 198/813 |
| 3,118,315 | A * | 1/1964 | Loosli | F16H 7/14 198/816 |
| 3,699,753 | A * | 10/1972 | Peak | A01D 61/008 56/14.5 |
| 3,854,572 | A | 12/1974 | Maiste | |
| 3,921,793 | A * | 11/1975 | Hutchinson | B65G 23/44 198/813 |
| 4,038,809 | A * | 8/1977 | Arnould | A01D 57/20 56/124 |
| 4,133,225 | A * | 1/1979 | Love | A01D 41/142 475/19 |
| 4,362,005 | A | 12/1982 | Hanaway et al. | |
| 4,421,228 | A * | 12/1983 | Marsiglio | B65G 23/44 198/814 |
| 4,430,847 | A * | 2/1984 | Tourdot | A01D 41/1274 474/1 |
| 4,803,804 | A * | 2/1989 | Bryant | B65G 23/44 198/813 |
| 5,026,326 | A * | 6/1991 | Pollich | F16H 7/12 198/813 |
| 5,030,173 | A * | 7/1991 | Bryant | B65G 23/44 474/136 |
| 5,054,608 | A * | 10/1991 | Bryant | B65G 23/44 198/816 |
| 5,156,261 | A * | 10/1992 | Dorner | B65G 23/44 198/816 |
| 5,984,083 | A * | 11/1999 | Hosch | B65G 23/44 198/810.04 |
| 6,109,427 | A * | 8/2000 | Hosch | B65G 23/44 198/835 |
| 6,116,008 | A * | 9/2000 | Digman | A01D 41/16 56/15.8 |
| 6,685,009 | B1 * | 2/2004 | Hosch | B65G 23/44 198/813 |
| 6,749,225 | B1 * | 6/2004 | Clute | B60R 22/1958 242/379.1 |
| 6,752,261 | B1 * | 6/2004 | Gaeddert | B65G 21/105 193/35 TE |
| 6,802,414 | B2 | 10/2004 | Buhne | |
| 6,997,307 | B2 * | 2/2006 | Iseli | B65G 23/44 198/813 |
| 7,766,736 | B2 | 8/2010 | Ramp et al. | |
| D750,864 | S * | 3/2016 | Roessler | D34/29 |
| 9,301,450 | B2 | 4/2016 | Boyd et al. | |
| 9,598,241 | B2 * | 3/2017 | Voigt | B65G 23/44 |
| 9,643,786 | B1 * | 5/2017 | Palmer | B65G 23/44 |
| 10,575,467 | B2 * | 3/2020 | Fuechtling | A01D 34/04 |
| 2006/0016165 | A1 * | 1/2006 | Wernsmann | A01D 61/008 56/16.6 |
| 2006/0183585 | A1 * | 8/2006 | Fairchild | B65G 23/44 474/101 |
| 2013/0255580 | A1 * | 10/2013 | Chellberg | B65G 23/44 119/56.1 |
| 2015/0321856 | A1 * | 11/2015 | De Goede | B65G 23/44 198/617 |
| 2015/0366139 | A1 * | 12/2015 | Rittershofer | A01F 12/46 460/114 |
| 2018/0332772 | A1 * | 11/2018 | Fuechtling | A01D 61/02 |
| 2019/0203812 | A1 * | 7/2019 | Veer | F16H 7/06 |
| 2019/0380273 | A1 * | 12/2019 | Mossman | B65G 23/44 |

* cited by examiner

SYSTEM FOR ADJUSTING THE CONVEYOR BELT TENSION FORCE WITHIN AN AGRICULTURAL HARVESTER

FIELD

The present disclosure generally relates to agricultural harvesters and, more particularly, to systems for selectively adjusting the conveyor belt tension force within an agricultural harvester.

BACKGROUND

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects plant materials from the field. The harvester also includes a plant processing system, which performs various processing operations (e.g., threshing, separating, etc.) to separate the crops from the other plant materials received from the harvesting implement. Furthermore, the harvester includes a crop tank, which receives and stores the crop materials after processing.

The harvesting implement generally includes a feeder conveyor for transporting the harvested plant materials from the harvesting implement to the plant processing system. In general, the feeder conveyor includes a plurality of rollers and a conveyor belt that wraps around and engages the rollers. Tension is applied to the conveyor belt to maintain engagement between the conveyor belt and the rollers. However, as the conveyor belt wears during operation of the conveyor, the conveyor belt stretches or elongates such that the tension thereon is reduced. Insufficient conveyor belt tension results in poor conveyor performance and/or increased wear on the conveyor components.

Accordingly, an improved system for adjusting the conveyor belt tension force within an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for adjusting the conveyor belt tension force within an agricultural harvester. The system may include a conveyor having a first roller, a second roller spaced apart from the first roller, and a conveyor belt configured to engage the first and second rollers. The system may also include a tensioner assembly having a ratcheting mechanism configured to selectively adjust a position of the first roller relative to the second roller to adjust a tension force exerted on the conveyor belt.

In another aspect, the present subject matter is directed to an agricultural harvester having a feeder. The harvester may also include a conveyor having a first roller, a second roller spaced apart from the first roller, and a conveyor belt configured to engage the first and second rollers. Furthermore, the harvester may include a tensioner assembly operably coupled to the first roller, with the tensioner assembly being configured to adjust the position of the first roller relative to the second roller to adjust the tension of the conveyor belt. Additionally, the harvester may include a linkage coupled between the tensioner assembly and a separate component of the harvester such that, as the feeder is moved between a raised position relative to the ground and a lowered position relative to the ground, the linkage actuates the tensioner assembly to adjust the tension of the conveyor belt.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for adjusting the tension on a conveyor belt of an agricultural harvester. Specifically, the disclosed system may include one or more components that allow for the tension force exerted on the conveyor belt to be selectively adjusted as the conveyor belt incurs wear during operation of the harvester, thereby maintaining the desired tension on the conveyor. For example, in several embodiments, the system may include a tensioner assembly having an input member configured to be moved as one component of the harvester (e.g., a header or other harvesting implement of the harvester) is moved relative to another component of the harvester (e.g., a frame of the harvester). The tensioner assembly also includes an output shaft coupled to a first roller that engages the conveyor belt. Furthermore, the tensioner assembly includes a ratcheting mechanism configured to selectively convert the movement of the input member into translation of the output shaft. Such translation of the output shaft may adjust the position the first roller relative to a second roller engaging the conveyor belt such that the tension on the conveyor belt is adjusted.

Figure 1:
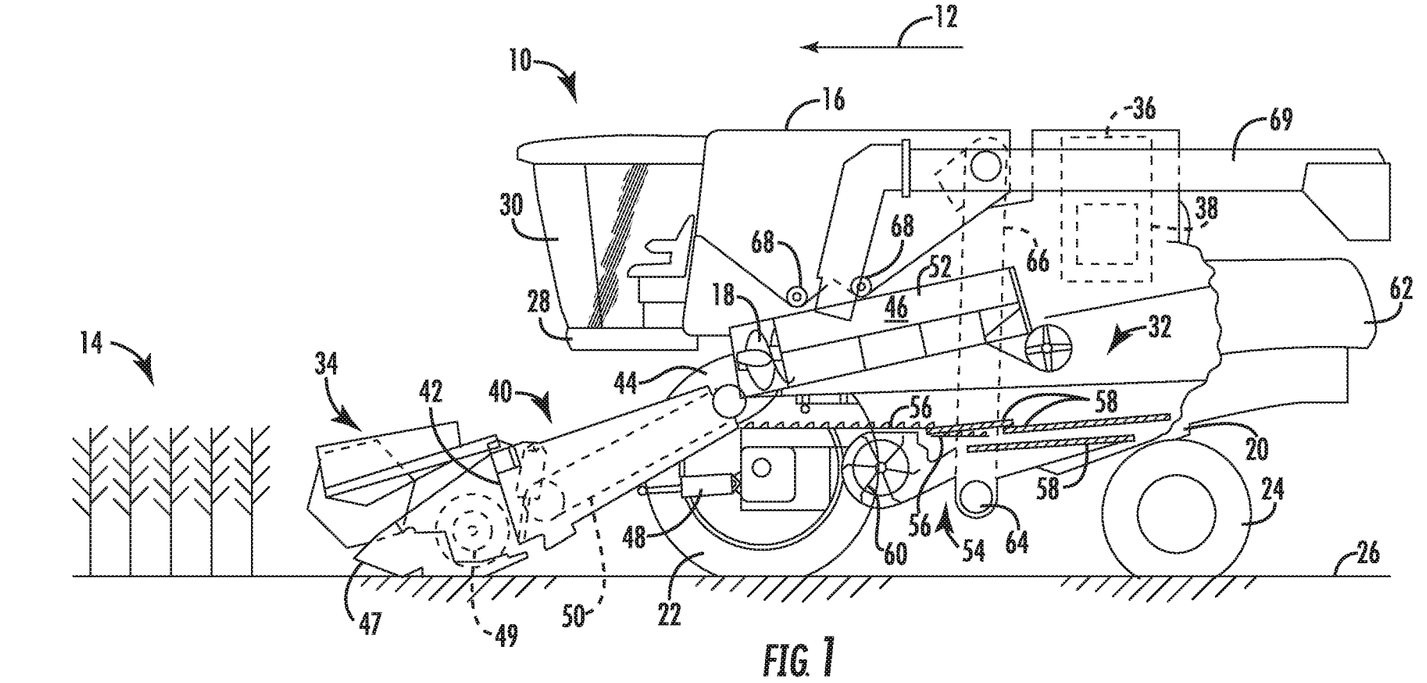
FIG. 1 illustrates a side view of one embodiment of an agricultural harvester in accordance with aspects of the present subject matter.

Referring now to the drawings, FIG. 1 illustrates a partial sectional side view of one embodiment of an agricultural harvester 10 in accordance with aspects of the present subject matter. In general, the harvester 10 may be configured to be moved across a field in a direction of travel (e.g., as indicated by arrow 12) to harvest standing crop 14. While traversing the field, the harvester 10 may be configured to intake and process harvested plant materials from the standing crop 14, thereby separating the crop materials of the harvested plant materials from the associated residue. Thereafter, the harvester 10 may be configured to store the crop materials within a crop tank 16 of the harvester 10 and discharge the remaining residue from the harvester 10. Furthermore, the harvester 10 may be configured to unload the crop materials stored within the crop tank 16 into a crop cart (not shown) or other suitable crop container.

As shown, in one embodiment, the harvester 10 may be configured as an axial-flow type combine, wherein the harvested plant materials are threshed and separated while being advanced by and along a longitudinally arranged rotor 18. However, it should be appreciated that, in alternative embodiments, the harvester 10 may have any suitable harvester configuration.

The harvester 10 may include a chassis or main frame 20 configured to support and/or couple to various components of the harvester 10. For example, in several embodiments, the harvester 10 may include a pair of driven, ground-engaging front wheels 22 and a pair of steerable rear wheels 24 that are coupled to the frame 20. As such, the wheels 22, 24 may be configured to support the harvester 10 relative to a ground surface 26 and move the harvester 10 in the forward direction of travel 12 relative to the ground surface 26. Furthermore, the harvester 10 may include an operator's platform 28 having an operator's cab 30, a plant processing system 32, and the crop tank 16 that are supported by the frame 20. As will be described below, the plant processing system 32 may be configured to perform various processing operations on the harvested plant materials as the plant processing system 32 operates to transfer the harvested plant materials received from a harvesting implement (e.g., header 34) of the harvester 10 through the harvester 10. Additionally, as is generally understood, the harvester 10 may include an engine 36 and a transmission 38 mounted on the frame 20. The transmission 38 may be operably coupled to the engine 36 and may provide variably adjusted gear ratios for transferring engine power to the wheels 22, 24 via a drive axle assembly (or via axles if multiple drive axles are employed).

Moreover, as shown in FIG. 1, the header 34 and an associated feeder 40 may extend forward of the frame 20 and may be pivotally secured thereto for generally vertical movement. In general, the feeder 40 may be configured to serve as support structure for the header 34. As shown in FIG. 1, the feeder 40 may extend between a front end 42 coupled to the header 34 and a rear end 44 positioned adjacent to a threshing and separating assembly 46 of the plant processing system 32. As is generally understood, the rear end 44 of the feeder 40 may be pivotally coupled to a portion of the harvester 10 to allow the front end 42 of the feeder 40 and, thus, the header 34 to be moved upward and downward relative to the ground 26 to set the desired harvesting or cutting height for the header 34. For example, as shown, in one embodiment, the harvester 10 may include a header actuator 48 configured to adjust the height of the header 34 relative to the ground 26. As such, the header actuator 48 may correspond to a fluid-driven actuator, such as a hydraulic or pneumatic cylinder, an electric linear actuator, or any other type of suitable actuator.

As the harvester 10 is propelled forwardly over the field with the standing crop 14, the plant materials are severed from the stubble by a sickle bar 47 at the front of the header 34 and delivered by a header auger 49 to the front end 42 of the feeder 40. A feeder conveyor 50 transports the harvested plant materials from the front end 42 of the feeder 40 to the threshing and separating assembly 46. As is generally understood, the threshing and separating assembly 46 may include a cylindrical chamber 52 in which the rotor 18 is rotated to thresh and separate the harvested plant materials received therein. That is, the harvested plant materials are rubbed and beaten between the rotor 18 and the inner surfaces of the chamber 52, whereby the crop materials (e.g., grain, seed, or the like) are loosened and separated from the straw of the plant materials.

The crop materials that have been separated by the threshing and separating assembly 46 may fall onto a crop cleaning assembly 54 of the plant processing system 32. In general, the crop cleaning assembly 54 may include a series of pans 56 and associated sieves 58. As is generally understood, the separated crop materials may be spread out via oscillation of the pans 56 and/or the sieves 58 and may eventually fall through apertures defined in the sieves 58. Additionally, a cleaning fan 60 may be positioned adjacent to one or more of the sieves 58 to provide an air flow through the sieves 58 that remove chaff and other impurities from the crop materials. For instance, the fan 60 may blow the impurities off of the crop materials for discharge from the harvester 10 through the outlet of a residue hood 62 positioned at the back end of the harvester 10. The cleaned crop materials passing through the sieves 58 may then fall into a trough of an auger 64, which may be configured to transfer the crop materials to an elevator 66 for delivery to the crop tank 16. Additionally, in one embodiment, a pair of tank augers 68 at the bottom of the crop tank 16 may be used to urge the cleaned crop materials sideways to an unloading tube 69 for discharge from the harvester 10.

Figure 2:
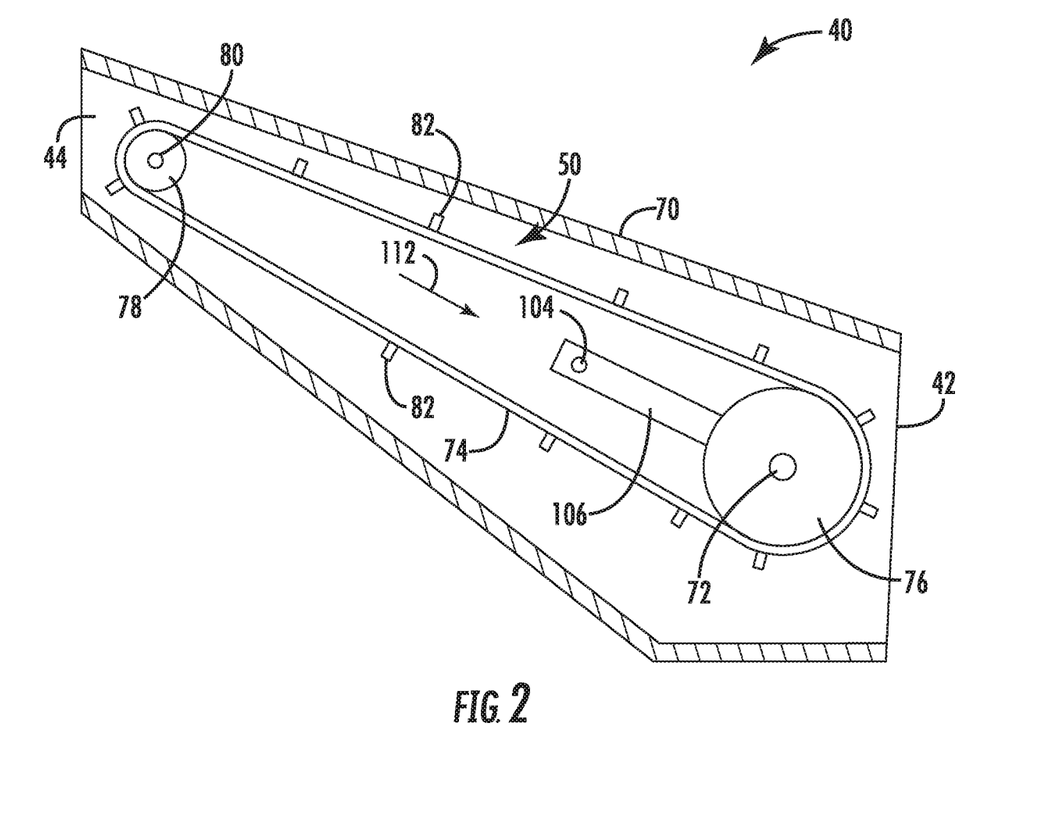
FIG. 2 illustrates a cross-sectional view of one embodiment of a feeder of an agricultural harvester in accordance with aspects of the present subject matter.
Figure 3:
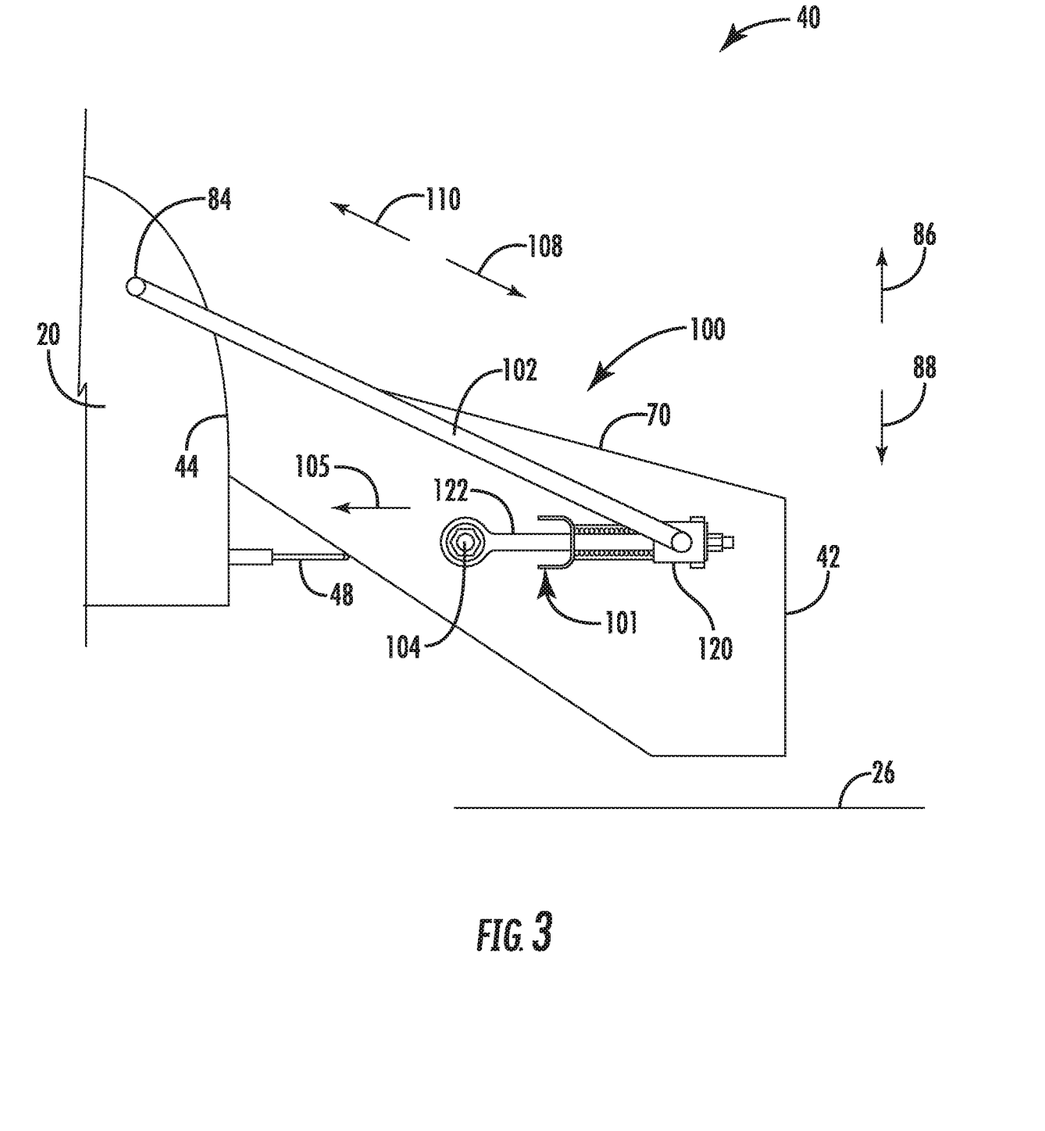
FIG. 3 illustrates a side view of the feeder shown in FIG. 2, particularly illustrating a linkage of the harvester configured to actuate a tensioner assembly of the harvester in accordance with aspects of the present subject matter.

FIGS. 2 and 3 illustrate differing views of one embodiment of the feeder 40 described above with reference to FIG. 1 in accordance with aspects of the present subject matter. Specifically, FIG. 2 illustrates a cross-sectional view of the feeder 40, particularly illustrating various components of the feeder conveyor 50. Additionally, FIG. 3 illustrates a side view of the feeder 40, particularly illustrating a linkage 102 coupled to a tensioner assembly 101 for adjusting the tension of the feeder conveyor 50.

As shown, the feeder 40 may include a feeder housing 70 configured to enclose and/or support one or more components of the feeder 40. Specifically, in several embodiments, the feeder conveyor 50 may be positioned within and mounted relative to the feeder housing 70. Furthermore, the tensioner assembly 101 and one or more associated connecting members 104, 106 may be coupled to the feeder housing 50. For example, in one embodiment, as shown in FIG. 3, the tensioner assembly 101 may be mounted to the exterior of the feeder housing 70 and coupled to a first connecting member 104, which extends through the housing 70. As shown in FIG. 2, the first connecting member 104 may be, in turn, coupled to a second connecting member 106, which may be coupled to a first axle 72 of the feeder conveyor 50. As will be described below, the tensioner assembly 101 and the associated connecting members 104, 106 may be configured to apply a tension force to a conveyor belt 74 of the feeder conveyor 50. Additionally, as shown in FIG. 3, the header actuator 48 may be coupled to the feeder housing 70 in a manner that allows the actuator 48 to raise and/or lower the front end 42 of the feeder 40 and the header 34 relative to the ground 26.

As indicated above, the feeder conveyor 50 may be configured to transport the harvested plant materials from the front end 42 of the feeder 40 to the rear end 44 of the feeder 40. Specifically, as shown in FIG. 2, the feeder conveyor 50 may, in several embodiments, include a first roller 76 positioned adjacent to the front end 42 of the feeder 40 and a second roller 78 spaced apart from the first conveyor 76 and positioned adjacent to the rear end 44 of the feeder 40. The conveyor belt 74 may be configured to be wrapped around or otherwise engage the rollers 76, 78. For example, in one embodiment, the first roller 76 may be mounted on and configured to be rotated about the first axle 72, while the second roller 78 may be mounted on and configured to be driven by a second axle 80. In such an embodiment, the second axle 80 and the second roller 78 may be configured to drive or otherwise rotate the conveyor belt 74 in a manner that transports the harvested plant materials through the feeder 40 (e.g., via a rotational drive source, such as a motor, coupled to the second axle 80). In this regard, the first roller 76 may be configured to apply the tension force on the conveyor belt 74 to maintain the engagement between the second roller 78 and the conveyor belt 74. Additionally, in one embodiment, the conveyor belt 74 may include a plurality of paddles or flights 82 configured to hold the harvested plant materials on the conveyor belt 74 as the conveyor belt 74 transports the harvested crop materials through the feeder 40. It should be appreciated that, in alternative embodiments, the first roller 76 may be configured to drive the conveyor belt 74, while the second roller 78 may be configured to apply the tension force to the conveyor belt 74. Furthermore, it should be appreciated that the feeder conveyor 50 may include additional rollers positioned between the first and second rollers 76, 78. Additionally, it should be appreciated that the conveyor belt 74 may be configured as a chain or any other suitable continuously looped device.

In several embodiments, the tensioner assembly 101 may be configured to be actuated by movement of the header 32 relative to the frame 20. Specifically, in one embodiment, the above-referenced linkage 102 may be coupled between a pivot point 84 on the frame 20 of the harvester 10 and the tensioner assembly 101. In this regard, as the header 32 and feeder 40 are moved between their lowered positions relative to the ground 26 and their raised positions relative to the ground 26, the linkage 102 actuates the tensioner assembly 101. For example, as the header actuator 48 lifts the header 32 relative the ground 26 (e.g., as indicated by arrow 86 in FIG. 3), the linkage 102 may be moved in a first direction (e.g., as indicated by arrow 108 in FIG. 3) relative to the feeder 40. Similarly, as the header actuator 48 lowers the header 32 relative the ground 26 (e.g., as indicated by arrow 88 in FIG. 3), the linkage 102 may be moved in a second direction (e.g., as indicated by arrow 108 in FIG. 3) relative to the feeder 40. As will be described below, movement of the linkage 102 in the first and/or second directions 108, 110 may rotate an input member 120 of the tensioner assembly 101 (e.g., into and out of the page in FIG. 3). Such rotation of the input member 120 may cause an output shaft 122 of the tensioner assembly 101 and the associated connecting members 104, 106 to translate (e.g., as indicated by arrow 105 in FIG. 3), thereby moving the first roller 76 relative to the second roller 78. In this regard, moving the first roller 76 away from the second roller 78 (e.g., as indicated by arrow 112 in FIG. 2) may increase the tension force applied on the conveyor belt 74 by the first roller 76. In the embodiment shown in FIG. 3, the linkage 102 is configured as a single shaft or bar. However, it should be appreciated that, in alternative embodiments, the linkage 102 may include any number and/or type of shafts, bars, links, and/or other suitable mechanical components for transmitting movement. Furthermore, it should be appreciated that the tensioner assembly 101 may be actuated by the relative movement of any other suitable components of the harvester 10. For example, in one embodiment, the tensioner assembly 101 may be actuated by movement of the unloading tube 69 relative to the frame 20.

It should be appreciated that the configuration of the harvester 10 described above and shown in FIGS. 1 through 3 is provided only to place the present subject matter in an exemplary field of use. Thus, it should be appreciated that the present subject matter may be readily adaptable to any manner of harvester configuration.

Figure 4:
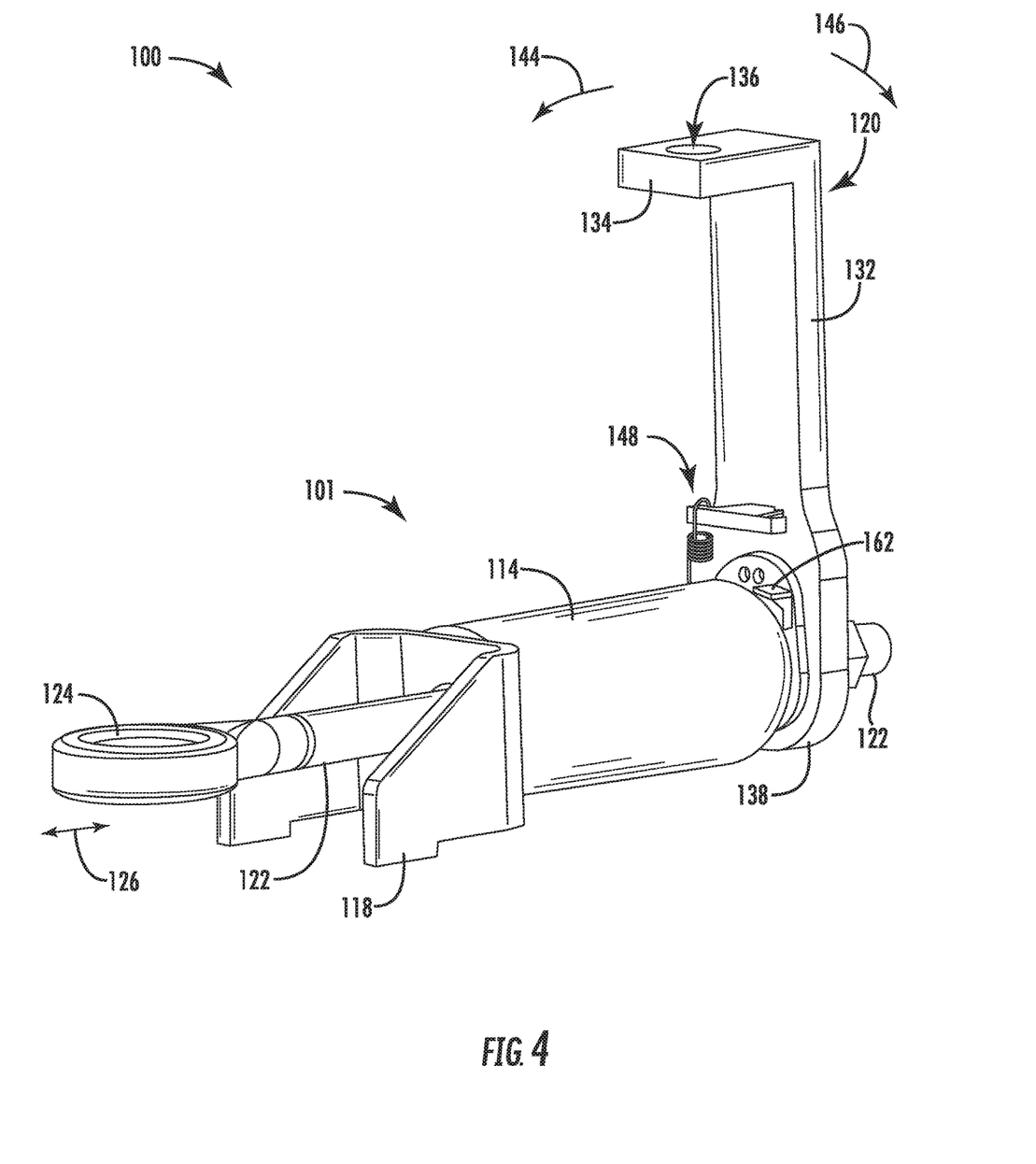
FIG. 4 illustrates a perspective view of one embodiment of a system for adjusting the tension on a conveyor belt of an agricultural harvester in accordance with aspects of the present subject matter, particularly illustrating a tensioner assembly of the system.
Figure 5:
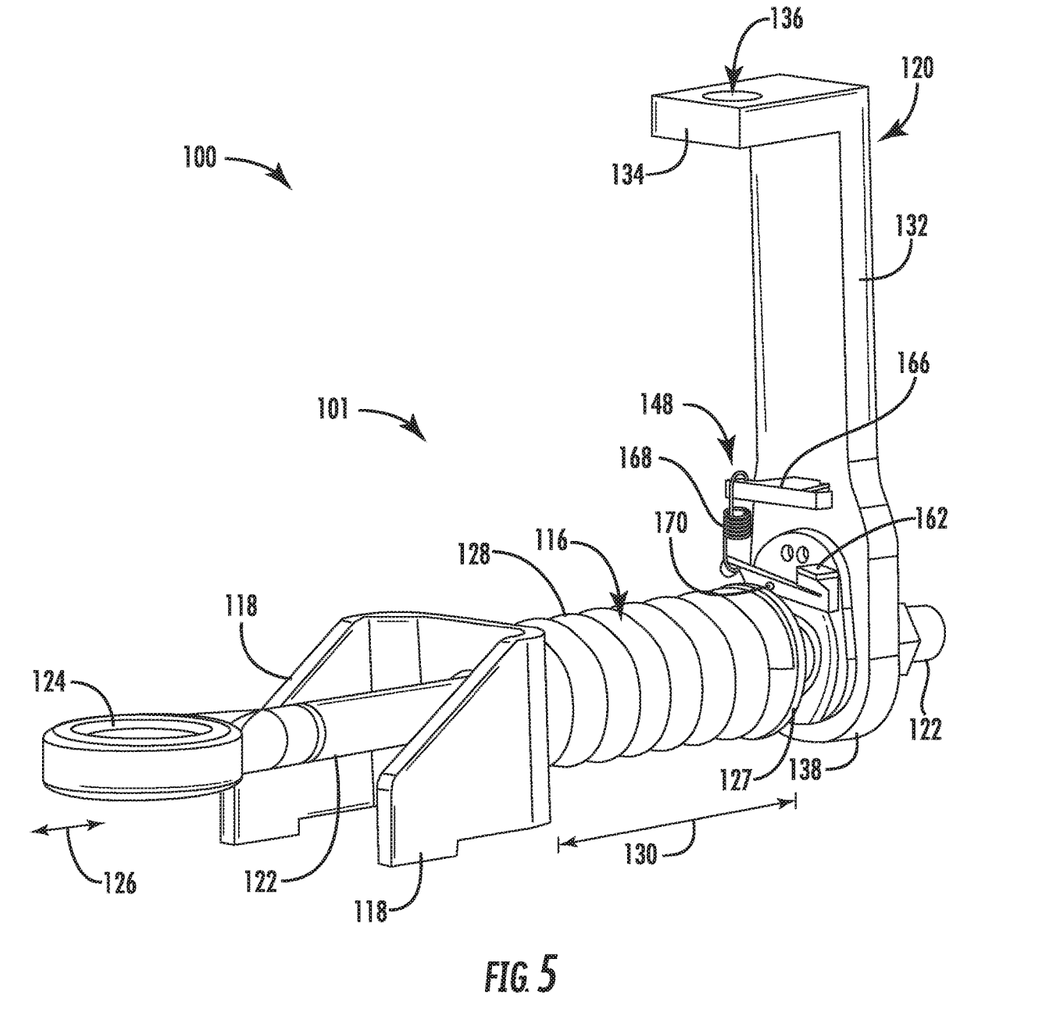
FIG. 5 illustrates a perspective view of the system shown in FIG. 4, particularly illustrating a biasing element of the tensioner assembly in accordance with aspects of the present subject matter.

Referring now to FIGS. 4 and 5, differing perspective views of one embodiment of a system 100 for adjusting the conveyor belt tension force within an agricultural harvester are illustrated in accordance with aspects of the present subject matter. Specifically, FIG. 4 illustrates a perspective view of the system 100, particularly illustrating a tensioner assembly 101 of the system 100, with a sleeve 114 of the tensioner assembly 101 being shown. Additionally, FIG. 5 illustrates a perspective view of the system 100 with the sleeve 114 of the tensioner assembly 101 removed for the purpose of illustrating a biasing element 116 of the tensioner assembly 101. In general, the system 100 will be described herein with reference to the harvester 10 described above with reference to FIGS. 1 through 3. However, it should be appreciated by those of ordinary skill in the art that the disclosed system 100 may generally be utilized with harvesters having any other suitable harvester configuration.

In general, the system 100 may include one or more components of the harvester 10. For example, in one embodiment, the system 100 may include the frame 20, the header 34, the feeder 40, the conveyor 50, the tensioner assembly 101, the linkage 102, and the connecting members 104, 106. However, it should be appreciated that, in alternative embodiments, the system 100 may include any other suitable component (s) or combination of components of the harvester 10.

As shown in FIGS. 4 and 5, the tensioner assembly 101 may generally include a biasing element 116, a support plate 118, an input member 120, and an output shaft 122. In general, the biasing element 116 may be configured to exert a biasing force on the output shaft 122, which, in turn, applies a tension force on the conveyor belt 74. Specifically, in several embodiments, one end of the output shaft 122 may be configured to be coupled to the connecting member 104 (FIG. 3). For example, in one embodiment, the output shaft 122 may be configured as an I-bolt, with a ring portion 124 thereof being coupled to the connection member 104. Moreover, the output shaft 122 may extend through the input member 120. As will be described below, a ratcheting mechanism 142 may be configured to convert the rotation of the input member 120 into translation of the output shaft along a direction (e.g., as indicated by arrow 126 in FIGS. 4 and 5) generally parallel to the longitudinal axis of the output shaft 122. Furthermore, the output shaft 122 may extend through an aperture (not shown) defined by the support plate 118 in a manner that allows the output shaft 122 to move or translate relative to the support plate 118 along the direction 126. The support plate 118 may, in turn, be coupled to and/or mounted on the feeder housing 70 (FIG. 3) such that the support plate 118 is positioned between the input member 122 and the ring portion 124 of the output shaft 122. In this regard, the biasing element 116 may be coupled between the support plate 118 and the input member 120. A spacer 127 may be positioned between the biasing element 116 and the input member 120 to prevent direct contact therebetween. As shown, in one embodiment, the biasing element 116 may be configured as a compression spring 128. As such, the compression spring 128 may be configured to apply an outward force on the input member 120, thereby biasing the input member 120 away from the support plate 118. The input member 120 may transmit this biasing force to the output shaft 122 (e.g., via the threaded connection therebetween), which, in turn, applies a tension force on the conveyor belt 74 via the connection members 104, 106 and the first roller 76 (FIG. 1). The magnitude of the applied tension force may generally be based on the length of the compression spring 128 (e.g., as indicated by arrow 130 in FIG. 5), with shorter lengths 130 generating greater tension forces and longer lengths 130 generated smaller tension forces. It should be appreciated that, in alternative embodiments, the biasing element 116 may be configured as any other suitable biasing device.

As indicated above, the tensioner assembly 101 may also include a sleeve 114. Specifically, in several embodiments, the sleeve 114 may be positioned around the compression spring 128. For example, in one embodiment, the sleeve 114 and the compression spring 128 may generally be concentric with each other. As will be described below, the sleeve 114 may be configured to set the desired length of the compression spring 128, which, in turn, sets the desired tension on the conveyor belt 74. However, it should be appreciated that, in alternative embodiments, any suitable device, such as a bar or shaft, may be configured to set the desired length of the compression spring 128.

In several embodiments, the input member 120 may configured to receive motion from the linkage 102 (FIG. 3) for adjusting the tension force applied to the conveyor 74. For example, in one embodiment, the input member 120 may include an arm 132 and a flange 134 integrally coupled to one end of the arm 132. The flange 134 may be oriented generally perpendicular to the arm 132 and may define an aperture 136 for receiving or coupling to one end of the linkage 102. The input member 120 may also include a head 138 integrally coupled to the opposed end of the arm 132. As shown, the output shaft 122 may extend through the head 138 of the input member 122. Furthermore, the head 138 may define a cavity 140 (FIG. 6) in which the ratcheting mechanism 142 (FIG. 6) is positioned for selectively converting the rotation of the input member 120, such as in a first direction (e.g., as indicated by arrow 144 in FIG. 4) and/or a second direction (e.g., as indicated by arrow 146 in FIG. 4), into translation of the output shaft 122 along the direction 126. Such translation of the output shaft 122 may increase or decrease the length 130 of the compression spring 128, thereby adjusting the tension force applied to the conveyor belt 74. However, it should be appreciated that, in alternative embodiments, the input member 120 may have any other suitable configuration and/or support or couple to any other suitable components.

As shown in FIG. 5, the tensioner assembly 101 may further include a pawl adjustment mechanism 148 configured to toggle the ratcheting mechanism 142 between a state in which the ratcheting mechanism 142 converts rotation of the input member 120 into translation of the output shaft 122 and a state in which the input member 120 is permitted to rotate without translating the output shaft 122. For example, in several embodiments, the pawl adjustment mechanism 148 may include a base 166, the pivot arm 162, and a biasing element 168 (e.g., a spring). In one embodiment, the base 166 may be coupled to and/or mounted on the arm 132 of the input member 120. The pivot arm 162 may be pivotably mounted to the head 138 of the input arm 120, such as at a pivot joint 170 positioned at a generally central location between its ends. As will be described below, a portion of one end of the pivot arm 162 may extend through an aperture (not shown) in the input member head 138 to engage the ratcheting mechanism 142 to adjust the state of the ratcheting mechanism 142.

Figure 6:
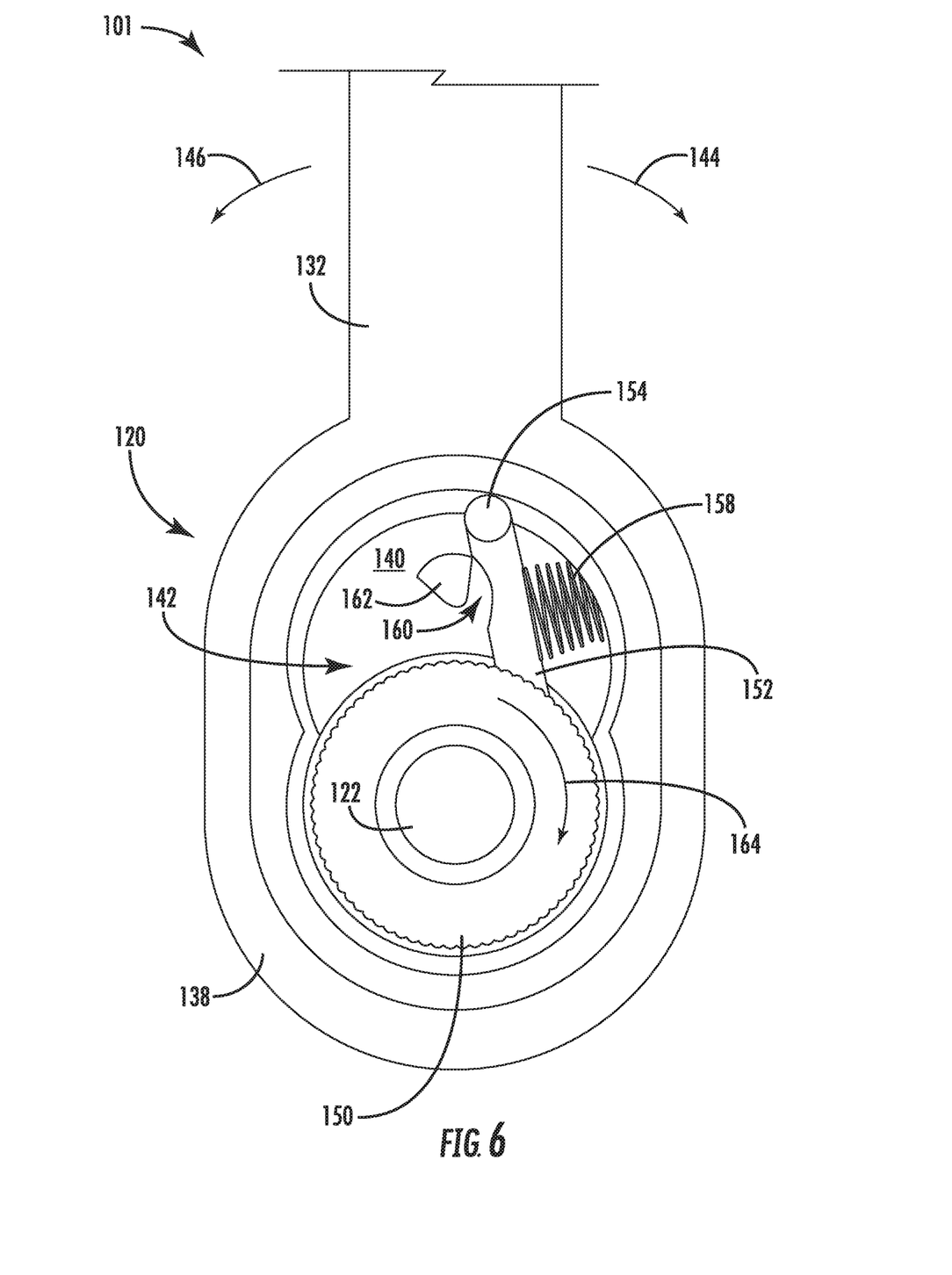
FIG. 6 illustrates a front view of the tensioner assembly shown in FIGS. 4 and 5, particularly illustrating a pawl of the tensioner assembly engaged with a gear of the tensioner assembly in accordance with aspects of the present subject matter.
Figure 7:
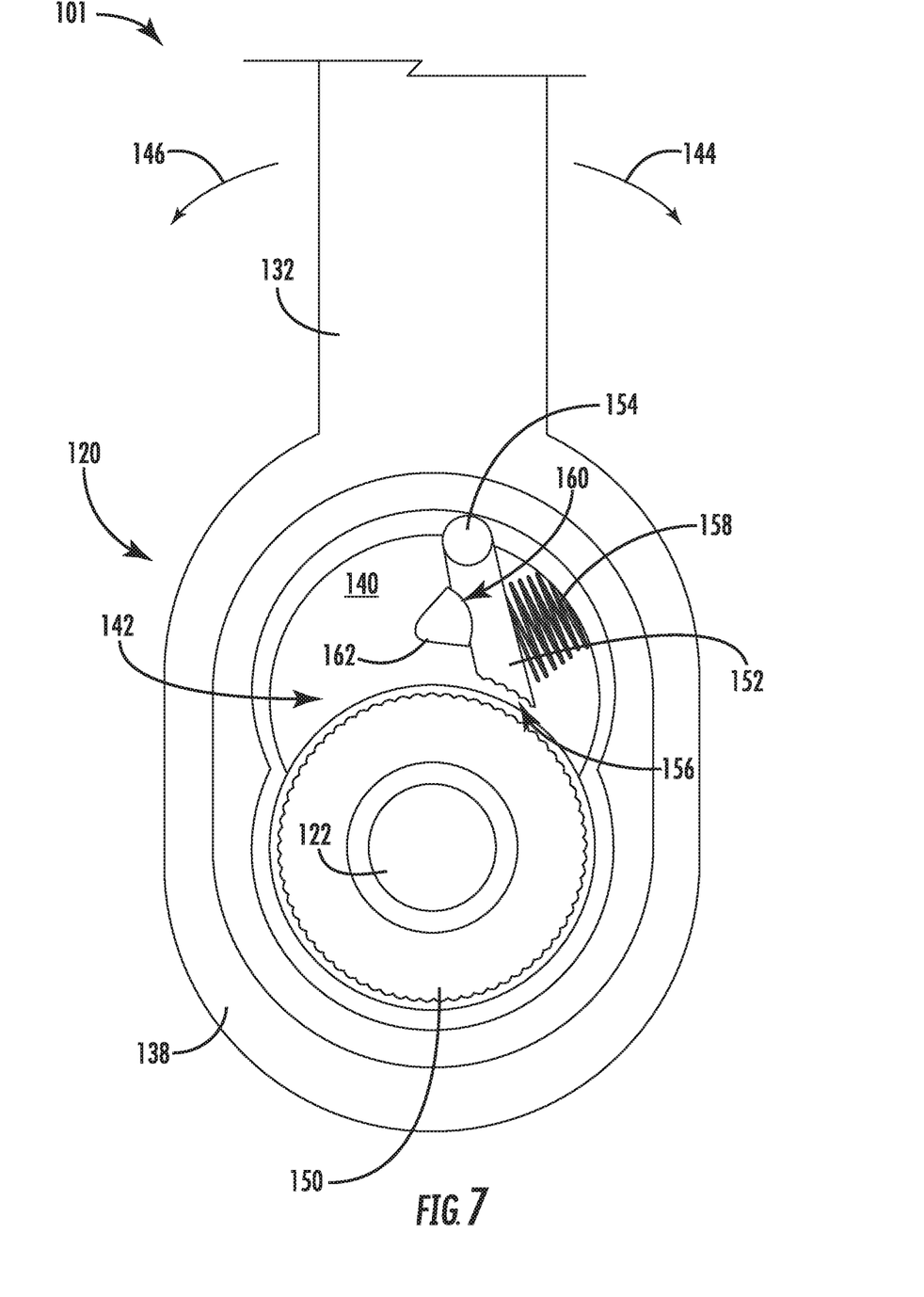
FIG. 7 illustrates another front view of the tensioner assembly similar to that shown in FIG. 6, particularly illustrating the pawl disengaged from the gear in accordance with aspects of the present subject matter.

Referring now to FIGS. 6 and 7, differing front views of the tensioner assembly 101 shown in FIGS. 4 and 5 are illustrated in accordance with aspects of the present subject matter. Specifically, FIG. 6 illustrates a front view of the tensioner assembly 101, particularly illustrating the ratcheting mechanism 142 positioned within the cavity 140 of the input member 120 so as to convert rotation of the input member 120 into translation of the output shaft 122. Additionally, FIG. 7 illustrates a front view of the tensioner assembly 101 shown in FIGS. 4 through 6, particularly illustrating the ratcheting mechanism 142 positioned within the cavity 140 of the input member 120 so as to allow rotation of the input member 120 without corresponding translation of the output shaft 122.

As shown, the ratcheting mechanism 142 may generally include one or more components configured to selectively convert the rotation of the input member 120 into translation of the output shaft 122. For example, in several embodiments, the ratcheting mechanism 142 may include a gear or toothed wheel 150 threadingly coupled to the output shaft 122 such that rotation of the gear 150 causes translation of the output shaft 122 (e.g., in the direction 126). The ratcheting mechanism 142 may also include a pawl 152, with one end of the pawl 152 being pivotably coupled to the head 138 of the input member 120 at a pivot joint 154. The opposed end of the pawl 152 may include teeth 156 configured to engage the gear 150. Furthermore, a biasing element 158, such as a spring, may be positioned between the input member head 138 and the pawl 152. In this regard, the biasing element 158 may be configured to apply a biasing force on the pawl 152 that biases the pawl 152 into engagement with the gear 150. As shown, in one embodiment, the pawl 152 may define a scallop or notch 160. In this regard, when a pivot arm 162 of the pawl adjustment mechanism 148 is positioned outside of the scallop 160 as shown in FIG. 6, the pawl 152 may be engaged with the gear 150. Conversely, when the pivot arm 162 is positioned within of the scallop 160 as shown in FIG. 7, the pawl 152 may be disengaged from the gear 150. However, it should be appreciated that, in alternative embodiments, the ratcheting member 142 may have any other suitable configuration.

As indicated above, the ratcheting mechanism 142 may be configured to convert the rotation of the input member 120 into translation of the output shaft 122 when the pawl 152 is engaged with the gear 150. For example, as shown in FIG. 6, when the gear 150 and pawl 152 are engaged, movement of the input member 120 in direction 144 may cause the gear 150 to rotate in a direction of rotation (e.g., as indicated by arrow 164), thereby causing the output shaft 122 to translate along direction 126 (FIG. 5). However, movement of the input member 120 in direction 146 may cause the teeth 156 of the pawl 152 to slide over the gear 150 such that the rotation of the input member 120 is not converted into rotation of the gear 150 and subsequent translation of the output shaft 122. As such, the gear 150 may only be allowed to rotate in direction 164 with rotation of the input member 120, which may prevent a reduction in the tension force applied to conveyor belt 74. Moreover, when the pawl 152 is disengaged from the gear 150 as shown in FIG. 7, the rotation of the input member 120 is similarly not converted into translation of the output shaft 122. Rather, in such instance, the input member 120 is simply configured to rotate relative to the gear 150.

Figure 8:
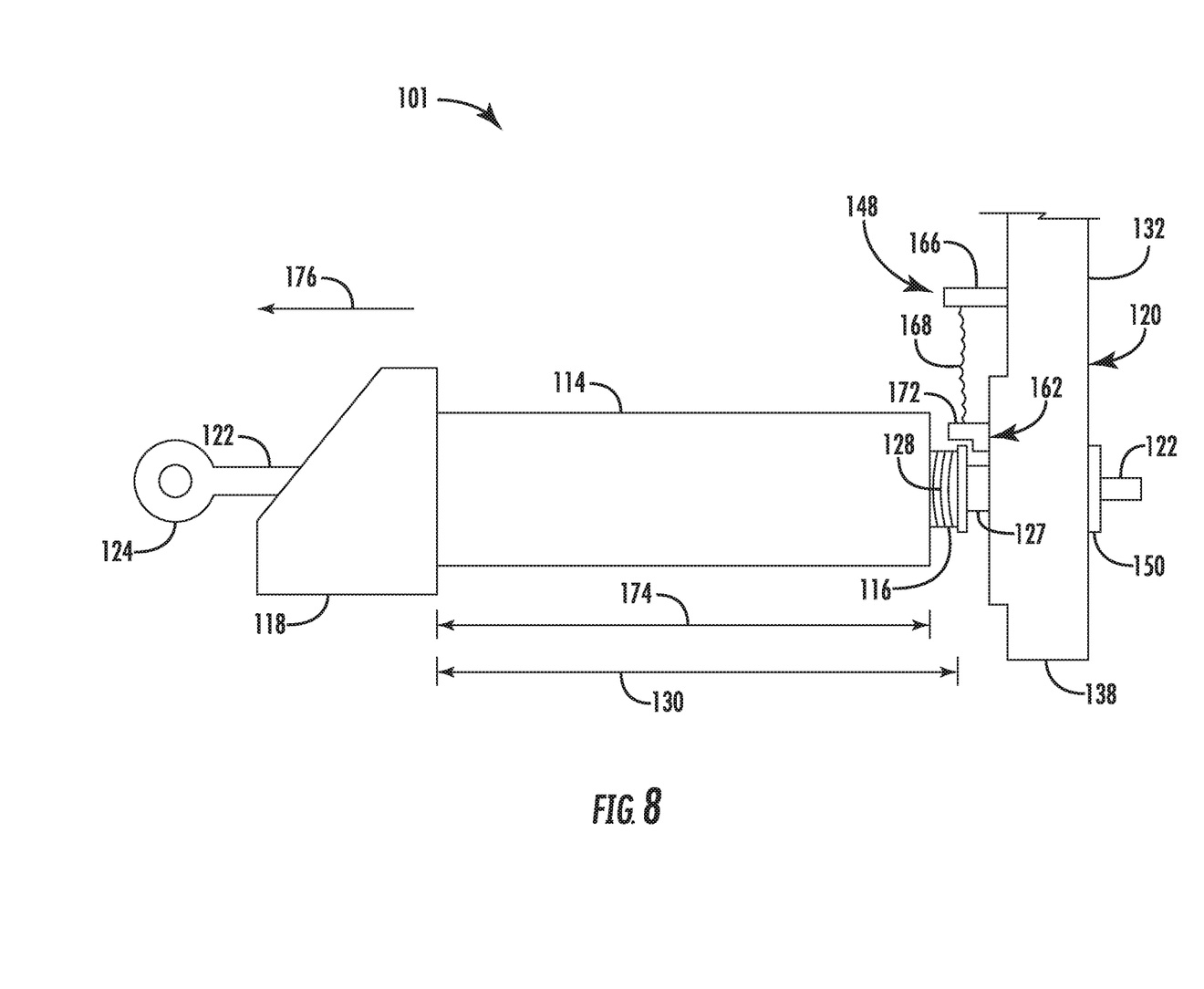
FIG. 8 illustrates a side view of the tensioner assembly shown in FIGS. 4 through 7, particularly illustrating the position of a sleeve of the tensioner assembly when the pawl is engaged with the gear in accordance with aspects of the present subject matter.
Figure 9:
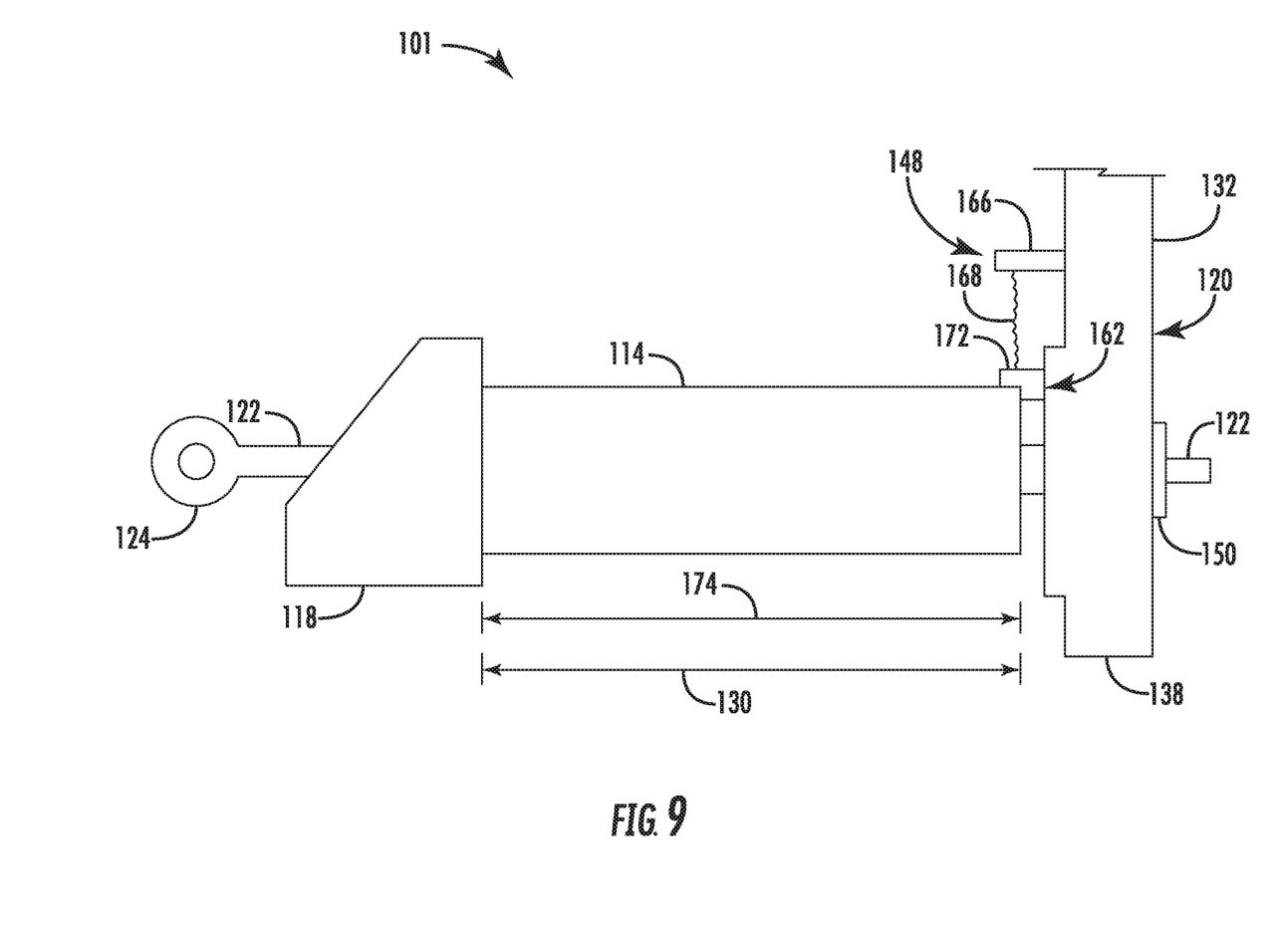
FIG. 9 illustrates another side view of the tensioner assembly similar to that shown in FIG. 8, particularly illustrating the position of the sleeve when the pawl is disengaged from the gear in accordance with aspects of the present subject matter.

Referring now to FIGS. 8 and 9, differing side views of the tensioner assembly 101 shown in FIGS. 4 through 7 are illustrated in accordance with aspects of the present subject matter. Specifically, FIG. 8 illustrates a side view of the tensioner assembly 101, particularly illustrating the position of the sleeve 114 of the tensioner assembly 101 when the pawl 152 is engaged with the gear 150.

Additionally, FIG. 9 illustrates another side view of the tensioner assembly 101 shown in FIGS. 4 through 8, particularly illustrating the position of the sleeve 114 of the tensioner assembly 101 when the pawl 152 is disengaged from the gear 150.

As indicated above, the pawl adjustment mechanism 148 may be configured to selectively engage and disengage the pawl 152 from the gear 150. Specifically, in several embodiments, a portion of one end of the pivot arm 162 of the pawl adjustment mechanism 148 may be configured to engage and disengage the pawl 152 as described above with reference to FIGS. 6 and 7. Moreover, such end of the pivot arm 162 may also include a tab 172 projecting outward toward the support plate 118 for selectively engaging the sleeve 114. Additionally, the biasing element 168 may be coupled between the base 166 and the opposed end of the pivot arm 162. As such, the biasing element 168 to configured to apply a biasing force on the pivot arm 162 that biases the pivot arm 162 into a position in which the pivot arm 162 is positioned outside of the scallop 160 of the pawl 152 (i.e., the pawl 152 is engaged with the gear 150).

Furthermore, as indicated above, the sleeve 114 may be configured to set the desired tension force applied to the conveyor belt 74. More specifically, as shown in FIG. 8, the length (e.g., as indicated by arrow 174 in FIG. 8) of the sleeve 114 is less than the length of the compression spring 128, which may be an indicator that the tension force applied by the compression spring 128 is too low. In such instances, the pivot arm 162 does not contact the sleeve 114, thereby permitting the biasing element 168 to move the pivot arm 162 in a manner that the pivot arm 162 is positioned outside of the scallop 160 in the pawl 152. When the gear 150 and the pawl 152 are engaged (e.g., as shown in FIG. 6), the ratcheting mechanism 142 may be configured to convert rotation of the input member 120 (e.g., as provided by raising and/or lowering the header 32) into translation of the output shaft 122. Such rotation may cause the output shaft 122 to move or translate in the direction toward the support plate 118 (e.g., as indicated by arrow 176), thereby compressing the compression spring 128 and increasing the biasing force applied to the output shaft 122.

Once the compression spring 128 provides the desired tension force on the conveyor belt 174, the sleeve 114 may be configured to prevent further compression of the compression spring 128. More specifically, as shown in FIG. 9, when the compression spring 128 is providing the desired tension, the length 130 of the compression spring 128 may be the same as or less than the length 174 of the sleeve 114. In such instances, the tab 172 of the pivot arm 162 contacts the sleeve 114, thereby positioning the pivot arm 162 within the scallop 160 defined by the pawl 152. When the gear 150 and the pawl 152 are disengaged (e.g., as shown in FIG. 7), the ratcheting mechanism 142 may be configured to allow rotation of the input member 120 (e.g., as provided raising and/or lowering the header 32) without converting such movement into translation of the output shaft 122. Without translation of the output shaft 122, the length 130 of the compression spring 128 remains constant.

In the embodiments described above with reference to FIGS. 4 through 9, the system 100 is configured to adjust the tension force applied to conveyor belt 74 of the feeder conveyor 50. However, it should be appreciated that, in alternative embodiments, the system 100 may be configured to adjust the tension force applied to any other suitable conveyor belt of the harvester 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for adjusting conveyor belt tension within an agricultural harvester, the system comprising:
   a conveyor comprising:
      a first roller,
      a second roller spaced apart from the first roller, and
      a conveyor belt configured to engage the first and second rollers; and a tensioner assembly including an input member, an output shaft, and a ratcheting mechanism, the output shaft arranged along a longitudinal axis, the input member configured to rotate about the longitudinal axis to translate the output shaft along the longitudinal axis to selectively adjust a position of the first roller relative to the second roller to adjust a tension force exerted on the conveyor belt.

2. The system of claim 1, wherein the output shaft is coupled to the input member, the output shaft is coupled to the first roller, and the ratcheting mechanism is coupled between the input member and output shaft to selectively convert movement of the input member into translation of the output shaft.

3. The system of claim 2, wherein the output shaft threadingly engages the input member such that rotation of the input member about the longitudinal axis relative to the output shaft moves the output shaft relative to the input member along the longitudinal axis of the output shaft to adjust the position of the first roller relative to the second roller.

4. The system of claim 3, wherein the tensioner assembly further includes a support plate and a biasing element coupled between the support plate and the input member, the biasing element being configured to bias the output shaft away from the support plate such that the tension force is exerted on the conveyor belt.

5. The system of claim 4, wherein the tensioner assembly further includes a sleeve positioned around the biasing element, the sleeve being configured to set a desired biasing force exerted on the output shaft by the biasing element.

6. The system of claim 2, wherein the ratcheting mechanism further includes a gear coupled to the output shaft and a pawl coupled to the input member, the ratcheting mechanism being configured to convert movement of the input member into translation of the output shaft when the pawl engages the gear.

7. The system of claim 6, wherein the tensioner assembly further includes a pawl engagement mechanism configured to selectively engage the pawl with the gear.

8. The system of claim 7, wherein the tensioner assembly further includes:
a spring defining a spring length, the spring being configured to exert a biasing force on the output shaft based on the spring length; and
a sleeve being positioned around the spring, the sleeve defining a sleeve length, wherein the pawl engagement mechanism is configured to engage the pawl with the gear when the spring length is greater than the sleeve length.

9. The system of claim 8, wherein the pawl engagement mechanism comprises a pivot arm coupled to the input member and a biasing element configured to bias the pivot arm to a position at which the pawl is engaged with the gear.

10. The system of claim 9, wherein, when the spring length is equal to or less than the sleeve length, the pawl engagement arm is configured to contact the sleeve such that the pawl is disengaged from the gear.

11. The system of claim 2, further comprising:
a linkage coupled between the input member and a first component of the agricultural harvester, the linkage being configured to transmit motion from movement of the first component of the harvester to the input member.

12. The system of claim 11, wherein the first component corresponds to a frame of the agricultural harvester and the second component corresponds to a harvester implement of the agricultural harvester.

13. An agricultural harvester, comprising:
a feeder;
a conveyor including a first roller, a second roller spaced apart from the first roller, and a conveyor belt configured to engage the first and second rollers;
a tensioner assembly operably coupled to the first roller, the tensioner assembly being configured to adjust the position of the first roller relative to the second roller to adjust the tension of the conveyor belt; and
a linkage coupled between the tensioner assembly and a separate component of the harvester such that, as the feeder is moved between a raised position relative to the ground and a lowered position relative to the ground, the linkage actuates the tensioner assembly to adjust the tension of the conveyor belt.

14. The agricultural harvester of claim 13, wherein the tensioner assembly comprises a ratcheting mechanism configured to selectively adjust the tension of the conveyor belt.

15. The agricultural harvester of claim 13, wherein the conveyor is positioned within the feeder.

16. The system of claim 13, wherein the separate component of the harvester corresponds to a frame of the harvester.

17. The system of claim 13, wherein the second roller is configured to drive the conveyor belt.

* * * * *